US010929863B2

(12) United States Patent
Yu

(10) Patent No.: US 10,929,863 B2
(45) Date of Patent: *Feb. 23, 2021

(54) DISTRIBUTED FORECASTING AND PRICING SYSTEM

(71) Applicant: International Business Machines Corporation, Armonk, NY (US)

(72) Inventor: Jia Yuan Yu, Quebec (CA)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/444,059

(22) Filed: Jun. 18, 2019

(65) Prior Publication Data

US 2019/0303957 A1 Oct. 3, 2019

Related U.S. Application Data

(63) Continuation of application No. 13/651,850, filed on Oct. 15, 2012, now Pat. No. 10,366,403.

(51) Int. Cl.
*G06Q 30/02* (2012.01)
(52) U.S. Cl.
CPC .............................. *G06Q 30/0206* (2013.01)
(58) Field of Classification Search
CPC ........................................... G06Q 10/00–30/00
USPC ................................................. 705/7.11–7.42
See application file for complete search history.

(56) References Cited

U.S. PATENT DOCUMENTS

| 5,608,620 A | 3/1997 | Lundgren | |
|---|---|---|---|
| 5,974,403 A * | 10/1999 | Takriti | G06Q 10/06 705/412 |
| 6,088,688 A * | 7/2000 | Crooks | G06Q 10/06 705/412 |
| 6,842,706 B1 * | 1/2005 | Baraty | G06Q 20/382 702/61 |
| 7,171,374 B1 | 1/2007 | Sheehan et al. | |
| 7,363,371 B2 | 4/2008 | Kirkby et al. | |

(Continued)

OTHER PUBLICATIONS

Nogales, Francisco Javier, et al. "Forecasting next-day electricity prices by time series models." IEEE Transactions on power systems 17.2 (2002): 342-348. (Year: 2002).*

(Continued)

*Primary Examiner* — Alan S Miller
(74) *Attorney, Agent, or Firm* — Scully, Scott, Murphy & Presser, PC; Kurt P. Goudy, Esq.

(57) ABSTRACT

Pricing a commodity based on a forecast received via remote access over a computer network. The forecast is an amount of the commodity that the user will use over a given time period. The provider supplies the user with an actual amount of the commodity over the given time period and then determines a price for the user for the supplied commodity, in retrospect, after the given time period, for the actual amount of the commodity supplied to the user over the given time period, based on the actual amount of the commodity provided to the user and an accuracy of the forecast of the amount of the commodity received from the user, the accuracy being determined by a difference between said forecast and the actual amount of the commodity supplied to the user over the given time period. The user is then charged to determined price.

20 Claims, 3 Drawing Sheets

(56) References Cited

U.S. PATENT DOCUMENTS

| | | | |
|---|---|---|---|
| 7,454,367 B2* | 11/2008 | Yu | G06Q 20/201 |
| | | | 705/26.62 |
| 7,693,762 B1* | 4/2010 | Dagum | G06Q 40/00 |
| | | | 705/35 |
| 7,711,655 B2 | 5/2010 | Abe et al. | |
| 8,019,697 B2* | 9/2011 | Ozog | G06Q 30/0283 |
| | | | 705/412 |
| 8,175,964 B2* | 5/2012 | Arfin | G06Q 30/0601 |
| | | | 705/1.1 |
| 8,234,017 B2 | 7/2012 | Ahn | |
| 8,364,609 B2* | 1/2013 | Ozog | H02J 3/008 |
| | | | 705/412 |
| 8,494,935 B2* | 7/2013 | Sandholm | G06Q 10/04 |
| | | | 705/35 |
| 8,606,421 B2 | 12/2013 | Oh et al. | |
| 8,768,527 B2 | 7/2014 | Tomita et al. | |
| 9,852,483 B2 | 12/2017 | Sawa et al. | |
| 2002/0022985 A1* | 2/2002 | Guidice | G06Q 10/0875 |
| | | | 700/28 |
| 2002/0133457 A1* | 9/2002 | Gerlach | H04M 15/7655 |
| | | | 705/39 |
| 2002/0174053 A1 | 11/2002 | Tan | |
| 2003/0009401 A1* | 1/2003 | Ellis | G06Q 30/04 |
| | | | 705/35 |
| 2003/0055677 A1* | 3/2003 | Brown | H02J 13/00001 |
| | | | 700/291 |
| 2003/0171851 A1* | 9/2003 | Brickfield | H02J 3/008 |
| | | | 700/286 |
| 2003/0189420 A1 | 10/2003 | Hashimoto et al. | |
| 2004/0078288 A1 | 4/2004 | Forbis et al. | |
| 2004/0088211 A1* | 5/2004 | Kakouros | G06Q 10/06395 |
| | | | 705/7.31 |
| 2004/0215529 A1 | 10/2004 | Foster et al. | |
| 2007/0226064 A1 | 9/2007 | Yu et al. | |
| 2007/0260562 A1* | 11/2007 | Hutson | G06Q 20/14 |
| | | | 705/412 |
| 2008/0046387 A1* | 2/2008 | Gopal | G01D 4/004 |
| | | | 705/412 |
| 2008/0091626 A1 | 4/2008 | Kremen | |
| 2008/0224892 A1 | 9/2008 | Bogolea et al. | |
| 2009/0157529 A1 | 6/2009 | Ehlers et al. | |
| 2009/0307117 A1* | 12/2009 | Greiner | G06Q 30/04 |
| | | | 705/34 |
| 2010/0106653 A1* | 4/2010 | Sandholm | G06Q 40/00 |
| | | | 705/80 |
| 2010/0138363 A1* | 6/2010 | Batterberry | G06Q 10/04 |
| | | | 705/412 |
| 2010/0179704 A1* | 7/2010 | Ozog | H02J 3/32 |
| | | | 700/291 |
| 2010/0250590 A1* | 9/2010 | Galvin | G06F 1/3203 |
| | | | 707/770 |
| 2011/0213644 A1* | 9/2011 | Phene | G06Q 30/0207 |
| | | | 705/14.1 |
| 2011/0231028 A1 | 9/2011 | Ozog | |
| 2012/0083930 A1 | 4/2012 | Ilic et al. | |
| 2012/0095841 A1* | 4/2012 | Luckerman | G06Q 30/04 |
| | | | 705/14.66 |
| 2012/0179596 A1 | 7/2012 | Mitsumoto et al. | |
| 2012/0232868 A1 | 9/2012 | Ricketts | |
| 2012/0323390 A1 | 12/2012 | Kobayasi | |
| 2013/0038468 A1* | 2/2013 | Wang | H02J 13/00001 |
| | | | 340/870.02 |
| 2013/0254151 A1* | 9/2013 | Mohagheghi | G06Q 30/0621 |
| | | | 706/46 |
| 2013/0282541 A1 | 10/2013 | Greiner et al. | |

OTHER PUBLICATIONS

González-Rivera, Gloria, Tae-Hwy Lee, and Santosh Mishra. "Forecasting volatility: A reality check based on option pricing, utility function, value-at-risk, and predictive likelihood." International Journal of forecasting 20.4 (2004): 629-645. (Year: 2004).*

Catalão, João Paulo da Silva, et al. "Short-term electricity prices forecasting in a competitive market: A neural network approach." Electric Power Systems Research 77.10 (2007): 1297-1304. (Year: 2007).*

Chan, Shing-Chow, et al. "Load/price forecasting and managing demand response for smart grids: Methodologies and challenges." IEEE signal processing magazine 29.5 (2012): 68-85 (Year: 2012).*

Doostizadeh, Meysam, and Hassan Ghasemi. "A day-ahead electricity pricing model based on smart metering and demand-side management." Energy 46.1 (2012): 221-230. (Year: 2012).*

Ghofrani, Mahmoud, et al. "Smart meter based short-term load forecasting for residential customers." 2011 North American Power Symposium. IEEE, 2011. (Year: 2011).*

Borenstein S. et al., "Dynamic Pricing, Advanced Metering, and Demand Response in Electricity Markets", Hewlett Foundation—Energy Foundation, 103 pages (Oct. 2002).

Catalão J.P.S. et al., "Short-Term Electricity Prices Forecasting in a Competitive Market: A Neural Network Approach", Electric Power Systems Research 77(10):1297-1304 (Aug. 2007).

Chan S.C. et al., "Load/Price Forecasting and Managing Demand Response for Smart Grids", IEEE Signal Processing Magazine 29(5):68-85 (Sep. 2012).

Doostizadeh M. et al., "A Day-Ahead Electricity Pricing Model Based on Smart Metering and Demand-Side Management", Energy 46(1):221-230 (Oct. 2012).

Ghofrani M. et al., "Smart Meter Based Short-Term Load Forecasting for Residential Customers", 2011 North America Power Symposium IEEE (2011).

González-Rivera G. et al., "Forecasting Volatility: A Reality Check Based on Option Pricing, Utility Function, Value-at-Risk, and Predictive Likelihood", International Journal of Forecasting 20:629-645 (2004).

Nogales F.J. et al., "Forecasting Next-Day Electricity Prices by Time Series Models", IEEE Transactions on Power Systems 17(2):342-348 (May 2002).

Pulido-Calvo I. et al., "Demand Forecasting for Irrigation Water Distribution Systems", Journal of Irrigation and Drainage Engineering 129(6):422-431, (Nov./Dec. 2003).

Zhou M. et al., "Electricity Price Forecasting With Confidence—Interval Estimation Through an Extended ARIMA Approach", Generation, Transmission and Distribution, IEE Proceedings, 153(2):187-195 (Mar. 2006).

Merriam-Webster, https://www.merriam-webster.com/dictionary/bandwidth (8 pages) (2017).

List of IBM Patents or Patent Applications Treated As Related dated Jun. 18, 2019, 2 pages.

U.S. Appl. No. 13/651,850, filed Oct. 15, 2012, US20140108093A1.

* cited by examiner

1

DISTRIBUTED FORECASTING AND PRICING SYSTEM

BACKGROUND OF THE INVENTION

This invention generally relates to pricing commodities, and more specifically, to pricing commodities based on a forecasting by the users of their expected use of the commodities.

An important problem for the producers of a commodity is to forecast the future demand for the commodity. An accurate forecast allows the producer to optimize the amount of the commodity to produce, thereby minimizing the production cost or waste and maximizing revenue from sales.

For example, a utility company produces electricity to accommodate a large number of users. The challenge in forecasting use is that the demand of each user is very uncertain and hard to predict. On the one hand, accurate forecasting is computationally hard, especially when there are millions of users or meters. On the other hand, inaccurate forecasts lead to wastes and inefficiencies, as, among other reasons, excess electricity cannot be readily or efficiently stored.

Better forecasts would allow the utilities to determine an optimum amount of power and how to produce that power, thereby minimizing production costs and environmental impact, while also maximizing the utility's revenue. For instance, by knowing the peak power demand, utilities can use generators that pollute less, and the utilities can even integrate more renewable sources of power, such as wind, solar and others, into the power production process.

The current approach taken by most utility companies is that the producer of the power forecasts the demand, decides the amount of power to produce, and sets the price. However, this approach has a number of drawbacks. These drawbacks include forecasting demand is very difficult, and inaccurate forecasts often lead to volatile prices and inefficient production. Further, as mentioned above, forecasting is computationally hard, especially when there are millions of individual users. In addition, with current approaches, typically there is no input in the forecasting from the users of the power.

SUMMARY OF THE INVENTION

In one embodiment, a computer implemented method includes forecasting and pricing for a commodity supplied by a provider to a user. One embodiment includes pricing a commodity based on a forecast received via remote access over a computer network. The forecast is an amount of the commodity that the user will use over a given time period. The provider supplies the user with an actual amount of the commodity over the given time period and then determines a price for the user for the supplied commodity, in retrospect, after the given time period, for the actual amount of the commodity supplied to the user over the given time period, based on the actual amount of the commodity provided to the user and an accuracy of the forecast of the amount of the commodity received from the user, the accuracy being determined by a difference between said forecast and the actual amount of the commodity supplied to the user over the given time period. The user is then charged to determined price.

A computer system that includes one or more processors operable to perform one or more methods described herein also may be provided.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION OF PREFERRED EMBODIMENTS

Figure 1:
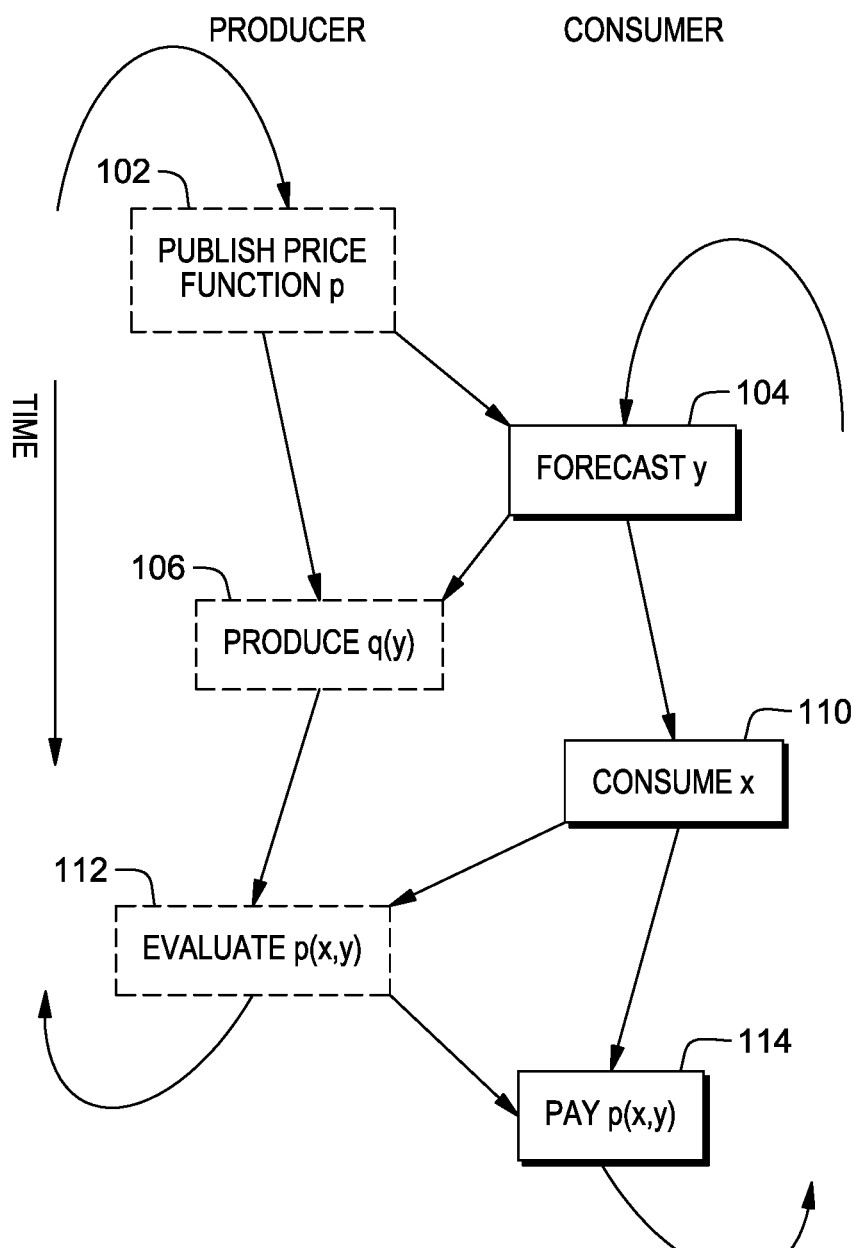
FIG. 1 is a timing diagram of the interactions between a producer and a consumer in embodiments of the invention.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, embodiments of the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The present invention relates to pricing a consumable commodity. In embodiments of the invention, the commodity is priced in retrospect based on actual consumption and the quality of an earlier forecast by each user of their expected consumption. More specifically, in embodiments of the invention, with reference to FIG. 1, the producer, at 102 announces a pricing policy p, which may be, for instance, a table of prices. Each user, at 104, first submits a forecast $\hat{x}$ of their expected use to the producer, and for example, this may be a forecast of the user's demand over the next twenty-four hours.

The producer, at 106, produces an amount of the commodity based on the forecasts of all the users. At 110, an amount x of the commodity is then consumed by the users or consumers. The producer, at 112, can observe this amount x through, for example, smart meters or other devices. Thereafter, each user, at 114, pays the producer an amount $p(x, \|x-\hat{x}\|)$ that depends on the actual amount x consumed by the user, the quality of the user's forecast $\|x-\hat{x}\|$, and the pricing policy p announced by the producer. These interactions can be repeated in real-time.

A wide range of commodities can be used in embodiments of the invention. For example, the commodity can be electricity, water, data bandwidth, or other articles, compositions, or services. In addition, the demand can be negative to accommodate users that are also suppliers of the commodity, and producers that are also consumers of the commodity.

Figure 2:
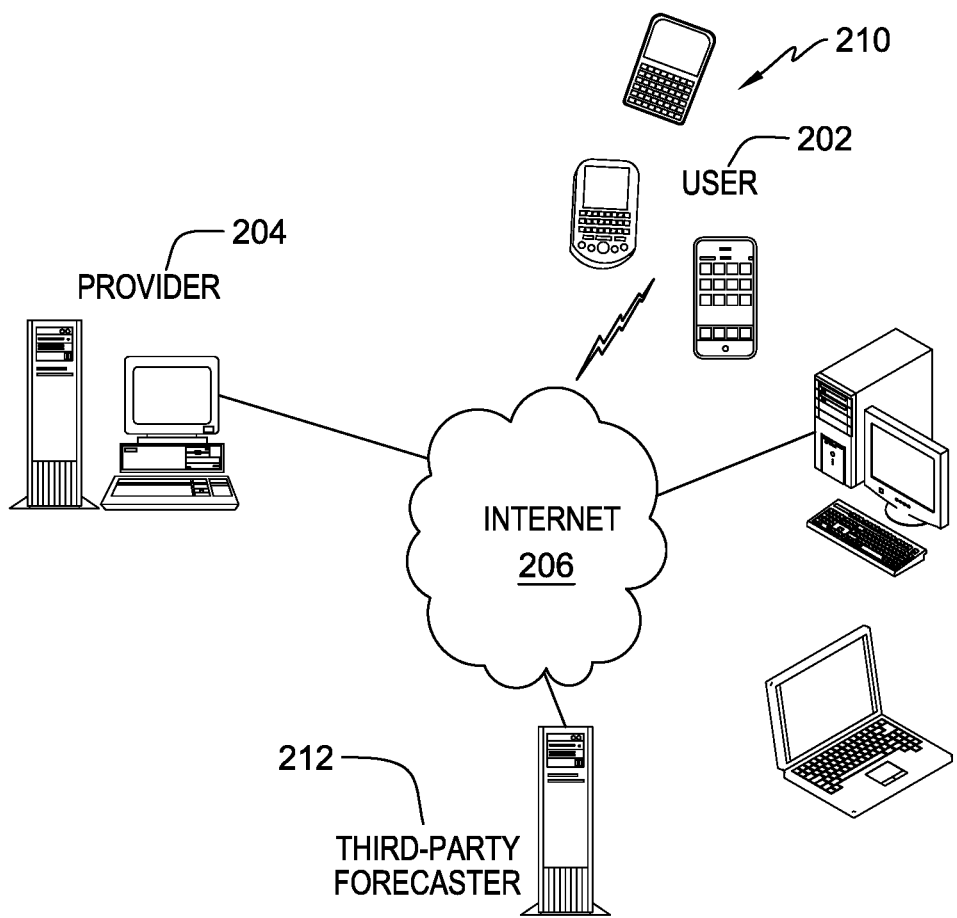
FIG. 2 illustrates, as an example, that a user may communicate a forecast to a producer of a commodity or to a third party.

As depicted in FIG. 2, the forecasts from the users 202 can be submitted to the providers 204 through the Internet 206, including via mobile devices 210 such as smartphones with dedicated applications. The forecasts can be of a mean, of a variance, or of upper and lower bounds of expected use, or the forecasts may be more complex. The forecasts, in embodiments of the invention, may be generated by one or more third party forecasters 212, or by one or more algorithms in place of the users.

The pricing function p can be simple or complex. In general, the price p is increasing with increases in the forecast error. Also, pricing may increase with increased uncertainty in the forecast. Many measures of error may be used in embodiments of the invention, such as a combination of mean and variance.

Figure 3:
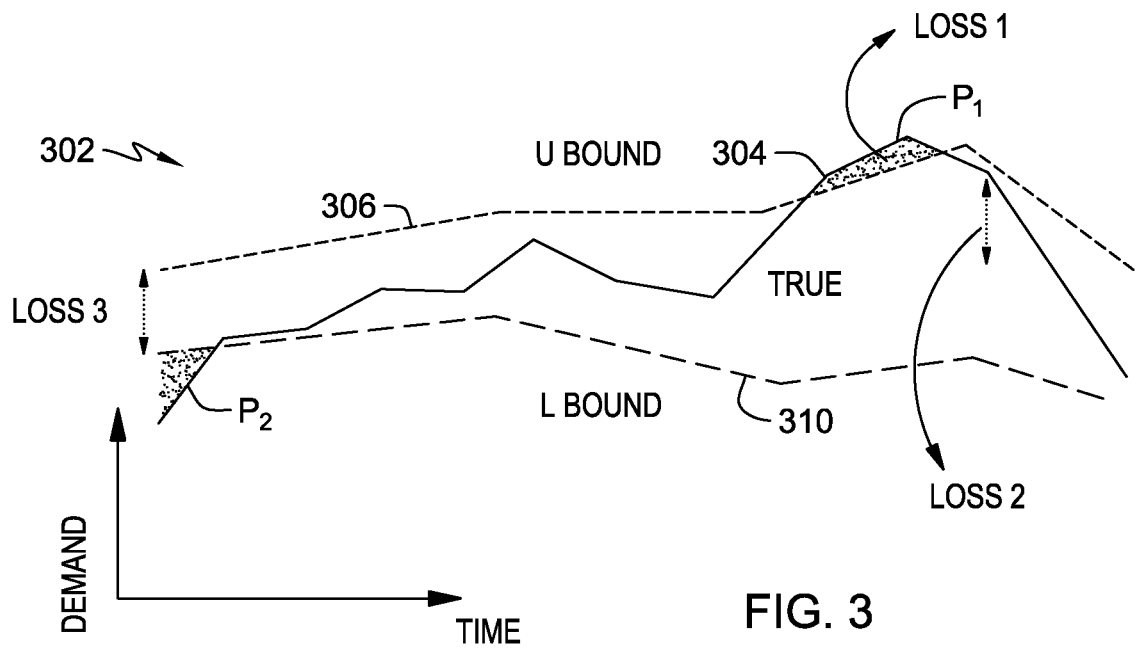
FIG. 3 shows an example of a user forecast and an actual consumption of a commodity by the user.

FIG. 3 shows a forecast 302 and the actual consumption 304 in another example of an embodiment of the invention. This forecast includes, upper and lower bounds 306 and 310 that are adjusted overtime. In this example, there is one supplier with many users. The supplier publishes a table of values p. Every twenty-for hours, each user submits a forecast for its own demand for each of the next twenty-for hours. The forecasts may be submitted, for instance, via the Internet. One embodiment of the forecast, shown in FIG. 3, includes upper bounds (U(1) . . . U(24)) and lower bounds (L(1) . . . L(24)), for the consumption or use of the commodity for each of the next twenty-four hours. In this example, over period P, the actual consumption is less than the forecast lower bound, at period $P_2$, the actual consumption in greater than the forecast upper bound.

The user and the provider, for example a utility provider, observe the actual consumption f(t) from, for example, data obtained from smart meters. The provider then charges each user a cost according to the user's forecast, the actual consumption, and the published table p. In this example, p is a function, p(f,L,U), of p, L and U.

As an example, consider a consumer who forecasts his electricity consumption for a particular week as follows:

|  | Sun. | Mon. | Tue. | Wed. | Thur. | Fri. | Sat. |
| --- | --- | --- | --- | --- | --- | --- | --- |
| Estimated daily consumption (in watts) | 10-12 | 6-8 | 6-8 | 4-6 | 6-8 | 9-11 | 12-15 |

The actual consumption turns out to be:

|  | Sun. | Mon. | Tue. | Wed. | Thur. | Fri. | Sat. |
| --- | --- | --- | --- | --- | --- | --- | --- |
| (in watts) | 13 | 5 | 4 | 5 | 7 | 10 | 14 |

The consumer thus has one day (Sunday) in which actual consumption was more than the forecast, and two days (Monday and Tuesday) in which actual consumption was less than the forecast.

The utilities pricing function is to charge the user $0.12/watt for actual consumption, with adjustments based on the accuracy of the forecast. For instance, for each watt in excess of a daily forecast, the utility may charge $0.36/watt, and for each day that actual consumption is below the forecast, the user is charged a penalty of $0.10.
In this example, then, the charge to the consumer is:

($0.12/watt)(58 watts)+($0.36/watt)(1 watt)+($0.10/day)(2 days)=$6.96+$0.36+$0.20=$7.52

As a variation on this example, the utility might provide users with an incentive to give forecasts with narrow ranges. The utility might give the consumer a discount of $0.01 for each daily range that is 2 watts or less, and add a penalty of $0.05 for each daily range that is 3 watts or more.
In this variation, the charge to the consumer would become:

$7.52−($0.01)(6)+($0.05)(1)=$7.52−$0.06+$0.05=$7.51

Embodiments of the invention may be used, for example, in the power generation industry to eliminate the need to build additional power plants to meet peak demand by an ICT solution that provides better forecasts of the demand in short and long term horizons. The distributed forecasting system reduces demand uncertainty through incentives for each user either to forecast accurately or to adjust demand to meet their forecast.

Embodiments of the invention are advantageous to users, who are usually reluctant to participate in price-responsiveness pricing plans in current power systems. This is because it is much easier for a user to forecast their demand than it is to change their habits under dynamic pricing plans. Moreover, providing users with an opportunity to help the environment is itself a strong incentive to users to participate in embodiments of the invention. A user-friendly interface in a smartphone app is an additional incentive to users to provide accurate forecasts.

Embodiments of the invention shift the burden of demand forecast from the utility company to the users, thus reducing the complexity of real-time forecasting the demand of millions of users. Moreover, it is much easier for individual users to forecast their own consumption. Each user can calibrate their forecasts over time by monitoring their actual consumption. The production savings realized by the producer from these more accurate forecasts may be passed on to the users through the incentives.

Embodiments of the invention are also advantageous to the utility companies. From a cost-benefit perspective, the cost to the utilities of implementing the incentive system of embodiments of the invention is potentially very low compared to the benefits resulting from the accuracy of the forecasts from the users. The ICT infrastructure for collecting the forecasts is the Internet, which is widely available. In many cases, real-time demand for individual users can already be collected from the smart meters already deployed or being deployed. The interface through which users submit their forecasts can be inexpensively implemented as smartphone applications.

The costs of embodiments of the invention are also offset by decreasing the effect of, for example, power generation on the environment, compared with alternatives that require building massive infrastructures.

In an embodiment, the invention provides a crowd-sourced, demand forecasting system. In this system, a utility company announces a pricing policy, each user forecasts their demand, and each user then consumes an amount of power from the utility company. The amount of power consumed by the user is different from their earlier forecast. The utility then charges each user according to the announced pricing policy, the accuracy of the user's forecast, and the actual consumed amount of power. The closer each user's forecast is to their actual consumption, the lower the price is to that user.

Embodiments of the invention reduce demand uncertainty through incentives for each user either to forecast accurately, or to adjust demand to meet their forecast.

Embodiments of the invention shift the forecast burden from the producer to the users, thus reducing the complexity of real-time forecasting the demand of millions of users. Moreover, it is much easier for individual users to forecast their own consumption. Each user can calibrate their forecast over time by monitoring their actual consumption. The production savings realized by the producer from these more accurate forecasts may be passed on to the users through the incentives.

Embodiments of the invention present a multi-step protocol between the producer and the consumer, each submitting information to the other in alternate time steps. This protocol gives the consumer sufficient incentive to provide accurate and useful forecast of demand.

The main current pricing approaches in the utility industry include time-of-use pricing, time-varying or dynamic pricing, hedging, and maximum import capacity. With time-of-use pricing, the cost of the power provided to the users varies according to the time of the day and the demand. With time-varying or dynamic pricing, also referred to as critical peak pricing, the supplier publishes a price $c_t$ for each instant of time t. The user can observe or try to forecast $c_t$, and adjust their power use based on these observations or forecasts.

With the hedging pricing approach, the supplier allows consumers to pay for power ahead of time—that is, before the users actually use the power. With the maximum import capacity pricing practice, each consumer chooses a maximum consumption level (that remains fixed for long periods of time), and pays penalties if their actual demand exceeds that maximum consumption level. However, consumers do not provide different forecasts of their use for different hours of the day, and do not submit real-time forecasts.

Figure 4:
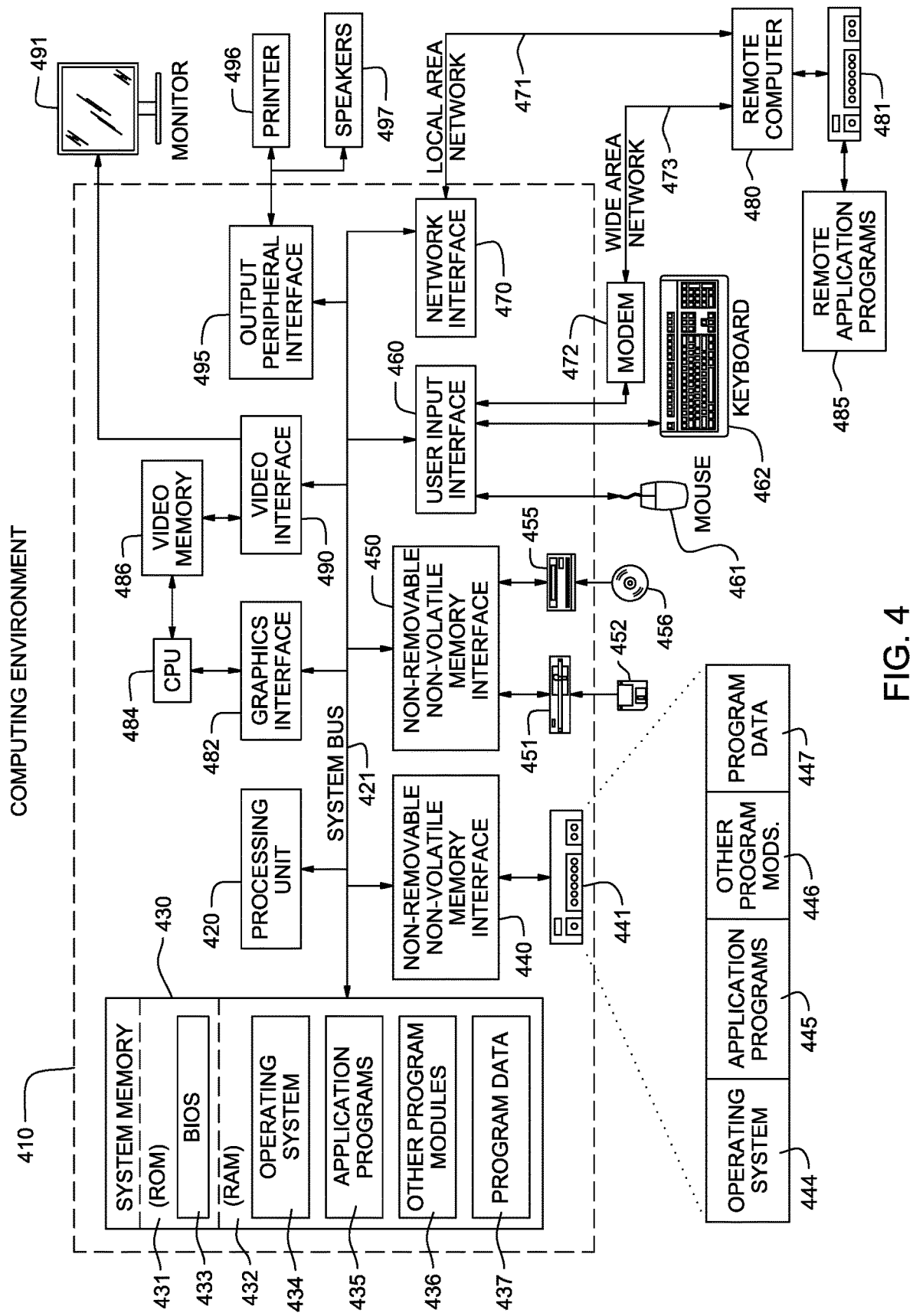
FIG. 4 shows a computing environment in which embodiments of the invention may be implemented.

With reference to FIG. 4, an exemplary system for implementing the invention includes a general purpose-computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 410.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4 provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies.

A user may enter commands and information into the computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB).

A monitor 491 or other type of display device is also connected to the system bus 421 via an interface, such as a video interface 490. A graphics interface 482, such as Northbridge, may also be connected to the system bus 421. Northbridge is a chipset that communicates with the CPU, or host-processing unit 420, and assumes responsibility for accelerated graphics port (AGP) communications. One or more graphics processing units (GPUs) 484 may communicate with graphics interface 482. In this regard, GPUs 484 generally include on-chip memory storage, such as register storage and GPUs 484 communicate with a video memory 486. GPUs 484, however, are but one example of a coprocessor and thus a variety of co-processing devices may be included in computer 410. A monitor 491 or other type of display device is also connected to the system bus 421 via an interface, such as a video interface 490, which may in turn communicate with video memory 486. In addition to monitor 491, computers may also include other peripheral output devices such as speakers 497 and printer 496, which may be connected through an output peripheral interface 495.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

One of ordinary skill in the art can appreciate that a computer 410 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a stand-alone computing device, having programming language functionality, interpretation and execution capabilities.

The description of the present invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and application of the invention, and to enable others of ordinary skill in the art to understand the invention. The invention may be implements in various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A method of supplying and pricing a commodity comprising:
   providing remote access over a computer network to users of the commodity;
   receiving a forecast from one of the users of the commodity over the computer network an amount of the commodity that the user will use over a given period of time;
   supplying the user with an actual amount of the commodity over the given period of time;
   determining a price for the user for use of the supplied commodity, in retrospect, after the given period of time, for the actual amount of the commodity supplied to the user over the given period of time, based on said actual amount of the commodity used by the user and an accuracy of the forecast of the amount of use of the commodity received from the user, said accuracy being determined by a difference between said forecast and the actual amount of the commodity supplied to the user over the given time period; and
   charging the user said determined price.

2. The method according to claim 1, further comprising monitoring the accuracy of the forecast from the user over time and adjusting the price for the user in response to the forecast accuracy.

3. The method according to claim 1, further comprising:
   receiving a forecast from a plurality of the users of the commodity over the computer network an amount of the commodity that the plurality users will use over a given period of time;
   supplying the plurality of users with an actual amount of the commodity over the given period of time; and
   determining an amount of the commodity to be produced based on all the forecasts received from the plurality of users and producing the determined amount of the commodity based on all the forecasts received from the plurality of users.

4. The method according to claim 3, further comprising receiving a forecast for amount of the commodity that the plurality of users will use over the given period of time from a forecaster, different from the plurality of users and the provider.

5. The method according to claim 1, wherein the given time period includes a multitude of time intervals and the forecast includes a mean of a multitude of partial amounts, each of said partial amounts being an amount of the commodity that the user will use in a respective one of said multitude of time intervals.

6. The method according to claim 1, further comprising determining uncertainty in the forecast based on forecast errors and increasing the price based on the uncertainty.

7. The method according to claim 1, further comprising receiving information from the user indicating a quantity of the commodity produced by the user and adjusting the amount of the commodity to be produced based on the quantity of the commodity produced by the user.

8. A computer program product for supplying and pricing a commodity, comprising:
   at least one tangible computer readable hardware device having computer readable program code logic tangibly embodied therein to price a commodity supplied to a user from a supplier based on collecting distributed forecasting of use of the commodity from a plurality of users, said computer readable program code, when executing in a computer, implementing the method comprising:
   providing remote access over a computer network to users of the commodity;
   receiving a forecast from one of the users of the commodity over the computer network an amount of the commodity that the user will use over a given period of time;
   supplying the user with an actual amount of the commodity over the given period of time;
   determining a price for the user for use of the supplied commodity, in retrospect, after the given period of time, for the actual amount of the commodity supplied to the user over the given period of time, based on said actual amount of the commodity used by the user and an accuracy of the forecast of the amount of use of the commodity received from the user, said accuracy being determined by a difference between said forecast and the actual amount of the commodity supplied to the user over the given time period; and
   charging the user said determined price.

9. The computer program product according to claim 8, further comprising monitoring the accuracy of the forecast from the user over time and adjusting the price for the user in response to the forecast accuracy.

10. The computer program product according to claim 8, further comprising:
    receiving a forecast from a plurality of the users of the commodity over the computer network an amount of the commodity that the plurality users will use over a given period of time;
    supplying the plurality of users with an actual amount of the commodity over the given period of time; and
    determining an amount of the commodity to be produced based on all the forecasts received from the plurality of users and producing the determined amount of the commodity based on all the forecasts received from the plurality of users.

11. The computer program product according to claim 10, further comprising receiving a forecast for amount of the commodity that the plurality of users will use over the given period of time from a forecaster, different from the plurality of users and the provider.

12. The computer program product according to claim 8, wherein the given time period includes a multitude of time intervals and the forecast includes a mean of a multitude of partial amounts, each of said partial amounts being an amount of the commodity that the user will use in a respective one of said multitude of time intervals.

13. The computer program product according to claim 8, further comprising determining uncertainty in the forecast based on forecast errors and increasing the price based on the uncertainty.

14. The computer program product according to claim 8, further comprising receiving information from the user indicating a quantity of the commodity produced by the user and adjusting the amount of the commodity to be produced based on the quantity of the commodity produced by the user.

15. A computer system for of supplying and pricing a commodity, comprising: one or more computer processors; one or more non-transitory computer-readable storage media; program instructions, stored on the one or more non-transitory computer-readable storage media, which when implemented by the one or more processors, cause the computer system to perform the steps of:
   providing remote access over a computer network to users of the commodity;
   receiving a forecast from one of the users of the commodity over the computer network an amount of the commodity that the user will use over a given period of time;
   supplying the user with an actual amount of the commodity over the given period of time;
   determining a price for the user for use of the supplied commodity, in retrospect, after the given period of time, for the actual amount of the commodity supplied to the user over the given period of time, based on said actual amount of the commodity used by the user and an accuracy of the forecast of the amount of use of the commodity received from the user, said accuracy being determined by a difference between said forecast and the actual amount of the commodity supplied to the user over the given time period; and
   charging the user said determined price.

16. The computer system according to claim 15, further comprising monitoring the accuracy of the forecast from the user over time and adjusting the price for the user in response to the forecast accuracy.

17. The computer system according to claim 15, further comprising:
   receiving a forecast from a plurality of the users of the commodity over the computer network an amount of the commodity that the plurality users will use over a given period of time;
   supplying the plurality of users with an actual amount of the commodity over the given period of time; and
   determining an amount of the commodity to be produced based on all the forecasts received from the plurality of users and producing the determined amount of the commodity based on all the forecasts received from the plurality of users.

18. The computer system according to claim 17, further comprising receiving a forecast for amount of the commodity that the plurality of users will use over the given period of time from a forecaster, different from the plurality of users and the provider.

19. The computer system according to claim 15, wherein the given time period includes a multitude of time intervals and the forecast includes a mean of a multitude of partial amounts, each of said partial amounts being an amount of the commodity that the user will use in a respective one of said multitude of time intervals.

20. The computer system according to claim 15, further comprising determining uncertainty in the forecast based on forecast errors and increasing the price based on the uncertainty.

\* \* \* \* \*